US012139437B2

(12) United States Patent
Balapour et al.

(10) Patent No.: US 12,139,437 B2
(45) Date of Patent: Nov. 12, 2024

(54) MANUFACTURING OF OFF-SPEC WASTE COAL COMBUSTION ASH-BASED LIGHTWEIGHT AGGREGATE

(71) Applicant: Drexel University, Philadelphia, PA (US)

(72) Inventors: Mohammad Balapour, Philadelphia, PA (US); Yaghoob Farnam, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 18 days.

(21) Appl. No.: 17/899,458

(22) Filed: Aug. 30, 2022

(65) Prior Publication Data

US 2023/0109441 A1    Apr. 6, 2023

Related U.S. Application Data

(60) Provisional application No. 63/238,268, filed on Aug. 30, 2021.

(51) Int. Cl.
*C04B 18/08* (2006.01)
*C04B 18/02* (2006.01)

(52) U.S. Cl.
CPC ............ *C04B 18/08* (2013.01); *C04B 18/082* (2013.01); *C04B 18/027* (2013.01); *Y02W 30/91* (2015.05)

(58) Field of Classification Search
CPC ..... C04B 18/08; C04B 18/082; C04B 18/027; C04B 18/02; Y02W 30/91
See application file for complete search history.

(56) References Cited

U.S. PATENT DOCUMENTS

| | | | |
|---|---|---|---|
| 2,987,411 A | 6/1961 | Minnick | |
| 4,772,330 A | 9/1988 | Kobayashi et al. | |
| 5,057,009 A * | 10/1991 | Nechvatal | F27B 7/00 |
| | | | 110/165 A |
| 5,584,895 A | 12/1996 | Seike et al. | |
| 5,737,896 A | 4/1998 | Rodgers | |
| 6,183,242 B1 | 2/2001 | Heian | |
| 6,755,905 B2 | 6/2004 | Ostes et al. | |
| 7,704,317 B2 | 4/2010 | Bethani | |
| 2006/0162618 A1 * | 7/2006 | Bethani | C04B 18/023 |
| | | | 264/117 |
| 2010/0144949 A1 | 6/2010 | Bethani | |
| 2012/0003136 A1 | 1/2012 | Skala et al. | |
| 2018/0179107 A1 | 6/2018 | Gao et al. | |
| 2019/0337848 A1 * | 11/2019 | Tran | C04B 14/22 |
| 2020/0208478 A1 | 7/2020 | Calva, Sr. | |

FOREIGN PATENT DOCUMENTS

| | | | |
|---|---|---|---|
| CN | 108834390 | | 11/2018 |
| FR | 1466703 | | 1/1967 |
| GB | 837382 | | 6/1960 |
| JP | 4599802 | | 12/2010 |
| JP | 2019095401 | | 6/2019 |
| KR | 100392933 | | 7/2003 |
| KR | 20130095982 A | * | 8/2013 |
| PL | 234361 B1 | * | 2/2020 |
| WO | WO2019/012074 | | 1/2019 |

OTHER PUBLICATIONS

T.Y Lo, Jul. 11, 2015, Elsevier Ltd., Journal of Cleaner Production, Eddition 112, 753-762 (Year: 2015).*
P. Suraneni, Jan. 1, 2021, American Concrete Institute, ACI Materials Journal, vol. 118, 160-165 (Year: 2021).*
T. A. Holm, Apr. 2007, ESCI, Reference Manual for the Properties and Application, 17 (Year: 2007).*
PL-234361-B1, machine translation (Year: 2020).*
KR-20130095982-A, machine translation (Year: 2013).*
Aineto, Monica et al., "Production of Lightweight Aggregates from Coal Gasification Fly Ash and Slag", World of Coal Ash, Apr. 2005.
Arioz, O. et al., "Lightweight Expanded Aggregate Production from Bottom Ash", Proceedings 10th ECerS Conf., 2007.
Billen, Pieter et al., "Melt Ceramics from Coal Ash: Constitutive product design using thermal and flow properties", Resources, Conservation & Recycling., 2018.
PCT/US2020/056976. International Search Report. Mailed Jan. 19, 2021.
PCT/US2020/056976. Written Opinion. Mailed Jan. 19, 2021.
Balapour, Mohammad et al., "Potential use of lightweight aggregate (LWA) produced from bottom coal ash for internal curing of concrete systems", Cement and Concrete Composites. Jan. 2020.
PCT/US2022/035719. International Search Report and Written Opinion. Mailed Sep. 23, 2022.

* cited by examiner

*Primary Examiner* — Anthony J Green
*Assistant Examiner* — Marites A Guino-O Uzzle
(74) *Attorney, Agent, or Firm* — Joseph E. Maenner; Maenner & Associates, LLC

(57) ABSTRACT

Off-spec fly ash-based spherical lightweight aggregate (LWA), designated SPoRA, was manufactured and its engineering properties, including specific gravity, dry rodded unit weight, water absorption, mechanical performance, and pore structure, were evaluated. Using the characterized SPoRA, lightweight concrete (LWC) samples were made and properties of the LWC were assessed and compared with samples made using the traditional LWA. The results indicated that fine and coarse SPoRA had 72 h absorption capacities of 16.4% and 20.9%, respectively, which were higher than that of traditional LWA. SPoRA had a saturated surface dry (SSD) specific gravity higher than traditional LWA, which resulted in higher fresh density for the LWC prepared with SPoRA. Large spherical type pores were found for SPoRA similar to the traditional slate-based LWA. The pore size distribution of SPoRA, characterized using a dynamic vapor sorption analyzer, indicated that more than 97% of the pores had pore diameters greater than 50 nm.

14 Claims, 5 Drawing Sheets

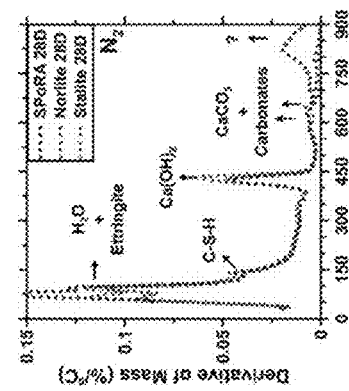
FIG. 13A
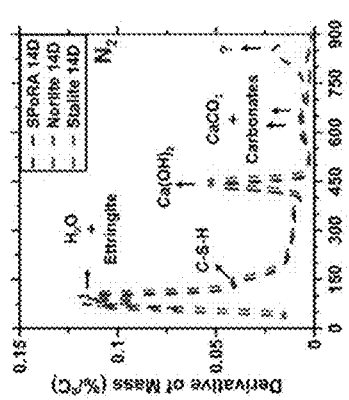
FIG. 13B
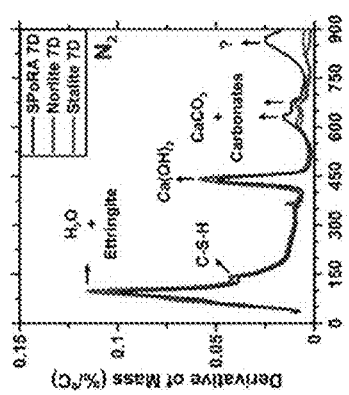
FIG. 13C
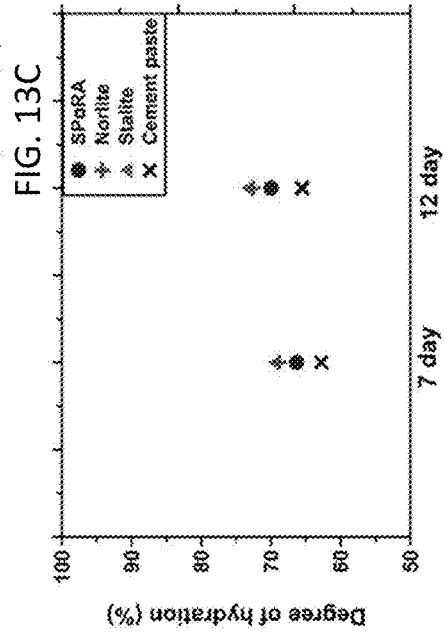
FIG. 14A
FIG. 14B

MANUFACTURING OF OFF-SPEC WASTE COAL COMBUSTION ASH-BASED LIGHTWEIGHT AGGREGATE

CROSS-REFERENCE TO RELATED APPLICATION

The present application claims the benefit of U.S. Provisional Patent Application Ser. No. 63/238,268, filed on Aug. 30, 2022, which is incorporated herein by reference in its entirety.

STATEMENT OF GOVERNMENT INTEREST

This invention was made with government support under Contract No. 1918838 awarded by the National Science Foundation. The government has certain rights in the invention.

BACKGROUND OF THE INVENTION

Field of the Invention

The invention relates to a method of producing lightweight aggregates from Waste-Coal Combustion Ash (W-CCA) and the resulting lightweight aggregates.

Description of the Related Art

Lightweight aggregate (LWA) can be divided into two categories: (i) natural and (ii) synthetic LWA. Natural LWA (e.g., pumice, scoria) are usually formed when molten lava from a volcano cools down leading to the formation of a well-sintered porous microstructure. On the other hand, synthetic LWA are produced by artificial sintering, which can be divided into three categories: (a) natural materials (e.g., clay, slate, and shale), (b) residential and commercial waste products (e.g., glass), and (c) industrial waste products (e.g., bottom ash, fly ash, sewage sludge). In the U.S., LWA production for use in concrete is mostly focused on traditional LWA that is produced by sintering natural materials such as clay, shale, and slate. LWA produced from waste products has only a small market share. The main reason that industrial waste products like waste fly ash and bottom ash are not used much for LWA production is related to manufacturing technical hurdles for consistent high quality production.

Fly ash is one of the by-products of burning coal in power plants for electricity production. One of the main applications of fly ash is its use in concrete as a supplementary cementitious material (SCM) for increasing mechanical and durability properties; in this case, it is called in-spec fly ash. However, not all the fly ash produced in the US is suitable for concrete applications due to its non-compliance with the required specifications found in standards such as ASTM C618 and AASHTO M 295; this kind of fly ash is called off-spec fly ash. In 2019, near 30 million tons of fly ash was generated in the US, of which only 60% was recycled and the rest (i.e., off-spec fly ash) was moved to the landfills and surface impoundments as industrial waste products. The historical accumulation of unrecycled fly ash can cause damage to the surface and groundwater, environment, and human health.

Previous studies have shown that fly ash is in fact an appropriate feedstock material for LWA production. However, these studies have mainly focused on using in-spec fly ash for LWA production. However, there have been reports of in-spec fly ash shortages for concrete applications in the US As such, researchers have attempted to use off-spec fly ash as feedstock material to produce LWA.

One of the challenges that has prevented US industrial production of off-spec fly ash-based LWA has been the high variability in the chemical composition of off-spec fly ash. The chemical composition of off-spec fly ash can change dramatically from one landfill to another, which complicates the production of consistent high-quality LWA from this material at an industrial scale. A thermodynamics-guided framework enables capturing the changes in the chemical composition of waste bottom ash and fly ash materials to successfully produce LWA from these materials. This thermodynamics-based framework quantifies the three required conditions including: (i) partial formation of a liquid phase, (ii) appropriate viscosity for solid-liquid phase, and (iii) formation of gaseous products that are entrapped by the liquid phase to successfully create a porous functional LWA. Based on these conditions, the appropriate ranges of temperature and viscosity to successfully produce porous LWA were identified.

It would be beneficial to characterize the engineering properties and pore structure of scaled-up off-spec fly ash-based LWA.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a lightweight aggregate comprising off-spec fly ash.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 13A is a graph of the differential thermogravimetric analysis curves for concrete samples prepared with SPoRA, Norlite, and Stalite LWA at 7 d;

FIG. 13B is a graph of the differential thermogravimetric analysis curves for concrete samples prepared with SPoRA, Norlite, and Stalite LWA at 14 d FIG. 13C is a graph of the differential thermogravimetric analysis curves for concrete samples prepared with SPoRA, Norlite, and Stalite LWA at 28 d;

FIG. 14A is a graph of normalized heat of hydration for cement and mortar samples over a period of 12 d; and FIG. 14B is a graph of the associated degree of hydration of the cement of FIG. 13A.

DETAILED DESCRIPTION

Figure 1C:
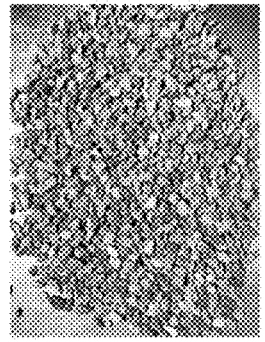
FIG. 1C is the physical appearance of Stalite LWA.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Table 1 shows the experimental program designed for this invention. Engineering properties such as specific gravity, dry-rodded unit weight, and water absorption, were assessed. Using a dynamic vapor sorption analyzer (DVSA), water desorption behavior was evaluated and its pore structure at the nano scale was characterized. In addition, x-ray computed tomography (XCT) was used to characterize and visualize the pore structure of LWA at the micro scale. The mechanical performance of bulk LWA was also evaluated. Also, properties such as fresh density, workability, and compressive strength of LWC manufactured using off-spec fly ash-based LWA and commercial LWA were assessed. Moreover, using thermogravimetric analysis (TGA) and isothermal calorimetry methods, the phase development and degree of hydration of LWC samples were characterized. The objectives, associated tests, sample type, and purpose of performing each test can be seen in Table 1.

TABLE 1

Experimental program

| Objective | Test | Sample | Purpose |
|---|---|---|---|
| 1 | Dynamic Vapor Sorption Analyzer | LWA | To characterize the desorption behavior of LWA and its pore structure at nano scale |
| | X-ray computed tomography | LWA | To characterize the pore structure of LWA at micro scale |

TABLE 1-continued

Experimental program

| Objective | Test | Sample | Purpose |
|---|---|---|---|
| | Crushing resistance | LWA | To assess the mechanical performance of LWA |
| 2 | Workability and fresh density | Fresh LWC | To evaluate the fresh properties of LWC |
| | Compressive strength | Hardened LWC | To evaluate the mechanical performance of LWC |
| | Thermogravimetric Analysis | Hardened LWC powder | To assess the phase development in LWC |
| | Isothermal Calorimetry | Mortar | To assess the degree of hydration |

Materials

Off-spec fly ash-based LWA was synthesized along with two commercial synthetic LWAs manufactured from shale and slate were used to produce concrete samples in order to investigate the effect of aggregate properties on the fresh, mechanical, and hydration properties of concrete. In the following section, the manufacturing process of off-spec fly ash-based LWA and the physical properties of LWA will first be discussed.

Off-Spec Fly Ash Based Lightweight Aggregate Manufacturing

The synthesized off-spec fly ash-based lightweight aggregate, which is denoted as Spherical Porous Reactive Aggregate (SPoRA), was produced by using off-spec high-calcium content fly ash whose chemical composition is reported in Table 2. As used and described herein, fly ash is off-spec because of non-compliance with the ASTM C618 standard. According to this standard, if the fly ash is to be used in concrete, it must have an LOI (loss on ignition) of less than 6% by mass. However, as can be seen in Table 2, the LOI content for fly ash was 8.47%.

The SPoRA manufacturing process includes mixing, pelletization, curing, and sintering. In the mixing stage, dried fly ash powder was mixed with NaOH aqueous solution with a molarity of 2.5 mol/L with a liquid to solid (L/S) mass ratio of 0.2. This concentration led to mass concentrations (i.e., the mass of solid NaOH per mass of solid fly ash) of 2%. NaOH was used as a fluxing agent to alleviate the thermal treatment stage by reducing the melting temperature of the mixture. In addition, NaOH was used for the purpose of initiating geopolymerization in the pelletization stage in order to chemically bind ashes together to form a spherical shape. The NaOH and L/S ratio have been obtained by optimization based on the previously developed thermodynamics-guided framework for successful LWA production. A vacuum mixer was used for the mixing process, according to the following procedure: (i) dried fly ash and NaOH solution was first mixed manually for 30 s, (ii) then they were mixed for one minute at a speed of 2500 RPM (revolutions per minute) using the vacuum mixer, and (iii) steps (i) and (ii) were repeated two more times to achieve a uniform mixture. After the mixing stage, the mixture was poured into the pelletizer at 140 RPM and 45° angle for 15 min to create spherical pellets. The pellets were cured int an environmental chamber at a temperature of 40° C. and relative humidity (RH) of 30% for 24 h. The geopolymerization occurred during the curing conditions. In the final stage, the pellets were sintered using a rotary furnace at 1075° C., 7 RPM, and an angle of 3.50°. The optimized temperature for sintering was obtained using the thermodynamics-guided framework previously developed by the authors.

TABLE 1

Chemical oxides of off-spec fly ash

| Chemical Composition (% by mass) | |
|---|---|
| $SiO_2$ | 38.19 |
| $Al_2O_3$ | 18.76 |
| $Fe_2O_3$ | 10.88 |
| $SO_3$ | 3.59 |
| CaO | 18.8 |
| $Na_2O$ | 1.12 |
| MgO | 3.6 |
| $K_2O$ | 0.98 |
| $P_2O_5$ | 0.7 |
| $TiO_2$ | 1.31 |
| Total | 97.93 |
| LOI | 8.47 |
| Unburnt Carbon | 7.0 |
| Initial moisture content | 1.21 |

LWA Physical Properties

Figure 1B:
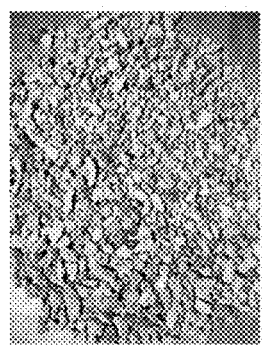
FIG. 1B is the physical appearance of Norlite LWA.
Figure 1A:
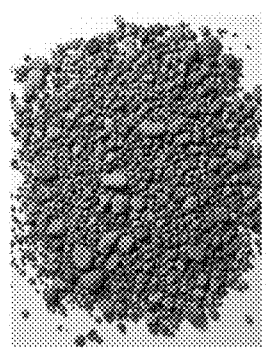
FIG. 1A is the physical appearance of Spherical Porous Reactive Aggregate (SPoRA) LWA.

FIG. 1A shows the physical appearance of SPoRA compared with two traditional LWAs including Norlite (FIG. 1B), and Stalite LWA (FIG. 1C). Norlite is a manufactured lightweight, porous ceramic material produced by expanding and vitrifying select shale in a rotary kiln. Stalite is slate formed from volcanic ash.

As can be seen, SPoRA is spherical while Norlite and Stalite are angular. The 72 h water absorption and specific gravity in oven dry (OD) and saturated surface dry (SSD) of the SPoRA and commercial LWA were evaluated according to ASTM C 127 and 128. Moreover, the dry rodded unit weight of the LWA was measured according to ASTM C29. Table 3 shows the physical properties of the fine (particles smaller than 4.75 mm) and coarse (particles greater and equal to 4.75 mm) portions. Particle size distribution for all the LWA passed the ASTM C330 requirement for gradation of structural LWA. As can be seen, SPoRA had the highest 72 h absorption capacity and SSD specific gravity.

TABLE 2

Lightweight aggregate physical properties

| Aggregate Type | SPoRA | | Norlite | | Stalite | |
|---|---|---|---|---|---|---|
| Aggregate Size | Fine | Coarse | Fine | Coarse | Fine | Coarse |
| 72 h Absorption (%) | 16.4 | 20.9 | 15.5 | 14.7 | 8.6 | 10.9 |
| Specific Gravity (OD) | 1.56 | 1.48 | 1.45 | 1.27 | 1.69 | 1.54 |
| Specific Gravity (SSD) | 1.81 | 1.78 | 1.68 | 1.46 | 1.8 | 1.6 |
| Dry Rodded Unit Weight (kg/m³) | 978 | 879 | 903 | 762 | 1040 | 928 |

Cement

Type I/II ordinary Portland cement, based on the ASTM C150 specification, was used to prepare concrete samples. The chemical and estimated Bogue compositions of the Portland cement are reported in Table 4.

TABLE 3

Chemical and Bogue composition of OPC Type I/II, with definition cement chemistry notation in parentheses

| Item | Amount (% by mass) |
|---|---|
| $SiO_2$ (S) | 18.94 |
| $Al_2O_3$ (A) | 5.00 |
| $Fe_2O_3$ (F) | 4.47 |
| CaO (C) | 61.36 |
| MgO | 2.96 |
| $SO_3$ | 3.55 |
| $Na_2O$ | 0.36 |
| $K_2O$ | 0.96 |
| $C_3S$ ($3CaO \cdot SiO_2$) | 57 |
| $C_2S$ ($2CaO \cdot SiO_2$) | 12 |
| $C_3A$ ($3CaO \cdot Al_2O_3$) | 5 |
| $C_4AF$ ($4CaO \cdot Al_2O_3 \cdot Fe_2O_3$) | 13 |
| Limestone | 3.9 |
| Loss on Ignition | 2.09 |

Lightweight Concrete Sample Preparation

Three types of concrete samples were prepared with a constant water-to-cement ratio of 0.42 (by mass) using SPoRA, Norlite, and Stalite. In order to estimate the uncertainty of the measurements, three replicates were prepared for each concrete sample and each curing period. The mixture proportions for the concrete samples are shown in Table 5. The maximum size of aggregate used was 9.5 mm (⅜ in). The aggregates used in the LWC were at the SSD condition. No chemical admixture was added to the concrete mixture. The concrete was mixed with a standard mixer and in accordance with ASTM C305. After mixing, cylindrical concrete samples were made using 50.8 mm (2 in) and 101.6 mm (4 in) cylindrical molds. The samples were demolded after 24 h and further cured in sealed double plastic bags for 7 days (d), 14 d, and 28 d at room temperature (23±2° C.).

TABLE 4

Proportions of LWC mixtures obtained using ACI 211.2 procedure

| Lightweight Concrete | Water (kg/m³) | Cement (kg/m³) | Coarse (kg/m³) | Fine (kg/m³) |
|---|---|---|---|---|
| SPoRA | 228 | 544 | 457 | 405 |
| Norlite | 228 | 544 | 395 | 372 |
| Stalite | 228 | 544 | 483 | 430 |

Testing Methods

Testing methods were divided into testing the LWA directly and testing the LWC made with the LWA. DVSA, XCT, and crushing resistance were performed on the LWA. Measurement of concrete fresh properties, compressive strength, TGA, and isothermal calorimetry was performed on LWC samples to evaluate fresh (before set), mechanical, and hydration properties.

LWA Testing Methods

Dynamic Vapor Sorption Analyzer (DVSA)

A DVSA instrument was used to evaluate the desorption behavior of LWA and characterize their pore structure at pore sizes smaller than 50 nm. An LWA specimen with an approximate mass of 60 mg was selected for each LWA type. The LWA was soaked in water for 24 h, taken out of the water and a paper towel was used to achieve an SSD condition. Next, the sample was placed in the quartz pan at a constant temperature of 23° C. for both the desorption and absorption cycles. The relative humidity (RH) was initially set to 97.5% and decreased in one step down to 96%, then down to 90% in steps of 2%, then down to 80% in steps of 5%, and finally decreased all the way to 0% in steps of 10%. After each step, the RH was kept constant for either 96 h or, if the mass change was less than 0.001 mg over 15 min, then the instrument proceeded to the next step. This procedure was applied in reverse to increase the RH to 97.5% for the absorption cycle.

To characterize pores smaller than 50 nm, the Kelvin-Young-Laplace equation can be employed to correlate the RH in water-filled pores to pore radius according to Equation 1. The reason that only pores smaller than 50 nm can be characterized using the DVSA method is that 97.5% RH correlates to a pore size of approximately 42 nm. The highest stable RH value that can be achieved using the instrument is 97.5%. In this equation, $\gamma$=water surface tension, RH=relative humidity, $V_m$=molar mass, R=gas constant i.e., 8.314 J·K−1·mol−1, and T=temperature (K).

$$r = 2\gamma/\ln(RH) * V_m/RT \qquad \text{Equation 1}$$

X-Ray Computed Tomography (XCT)

A Skyscan 1172 was used to perform XCT and characterize the LWA pore structure on the same samples that were tested by DVSA. The X-ray tube was set for a voltage of 100 kV and a current of 100 µA, while the voxel size was set for 2.73 µm. Al+Cu was used as the filter for scanning. The exposure time per step for a rotation of 180° was ≈3.245 s. 2D projections of the LWA were collected and using the software supplied with the Skyscan 1172, tomographic reconstruction was performed to obtain approximately 1000 2D cross-sectional slices of the LWA. A ring artifact reduction filter was used during tomographic reconstruction to increase the quality of the reconstructed 2D slices. The visualization and calculations presented herein were performed using Dragonfly Software.

To calculate the porosity and obtain the pore size distribution of the LWA for each dataset, a cubic volume of interest (VOI) with a size of 1092 µm×1092 µm×1092 µm was extracted from each LWA. The pore segmentation was done using the Otsu method. A plugin of Dragonfly software called OpenPNM2 was used for the extraction of the pore network of the LWA from the segmented pore-solid phase. The plugin uses an algorithm referred to as SNOW (sub-network of the over-segmented watershed), which is based on marker-based segmentation for the extraction of pores. This method consists of five steps. In the first step, the distance map of pore space in the binary image is obtained and smoothened using a Gaussian blur filter. In the second step, the peaks are identified in the distance map using a maximum filter with a spherical structuring element of radius R. In the third step, any extraneous peak in the previous step is trimmed, which is the key to avoiding over-segmentation. A detailed description of this method can be found elsewhere. In step four, the image is segmented into pore regions using a marker-based watershed segmentation method, where the corrected maxima identified in the previous step are used as the markers. Finally, the segmented image is used to obtain information about the pore and throat (channel) size distributions and the network connectivity.

LWA Crushing Strength

LWA was first sieved into the following size ranges: 4.75 mm to 5.60 mm, 5.60 mm to 6.35 mm, 6.35 mm to 9.5 mm, and 9.5 mm to 12.5 mm. The crushing strength of both bulk and single LWA were measured. The crushing strength of bulk LWA was performed in accordance with European standard specification EN 1097-11. For the crushing resistance test of LWA, a cylinder with a diameter of 73 mm and a height of 74 mm was used. The LWA sample was poured into the cylinder, and next, the cylinder was placed on a vibration table for 45 s. Then, additional LWA was added to the cylinder to level the surface. A steel piston with a diameter of 71.25 mm was used to load to the LWA in the cylinder. A compressive testing machine was used to apply the loading rate of 0.2 mm/s to the piston. The crushing resistance strength was calculated based on the load that led to 20 mm displacement for LWA in the cylinder and the cross-sectional area of the cylinder, according to Equation 2.

$$\text{Bulk LWA crushing resistance strength} = P20 \text{ mm}/A \quad \text{Equation 2}$$

To measure the crushing strength of single LWA, the SPoRA LWA with specific size was placed between two parallel plates and were crushed using the CT5 instrument with 0.98 N force accuracy. The loading speed was set at 2 mm/min. Due to the high variability of the single LWA crushing strength, 20 samples were tested for each size category of the LWA. It has been shown that the crushing strength of spherical ceramics materials with brittle behavior can be calculated using Equation 3, where P is the load at failure and D is the distance between the loading points.

$$\text{Single LWA crushing strength} = 2P/\pi D^2 \quad \text{Equation 3}$$

LWC Testing Methods
LWC Fresh Properties

The freshly mixed concrete density, oven-dry density, and equilibrium density of LWC were measured and predicted based on ASTM C567. The calculated oven-dry density was determined according to Equation 4. In this equation, $O_c$ is the calculated oven-dry density, $M_{df}$ is the mass of dry fine LWA in the batch, Mac is the mass of coarse dry LWA in the batch, $M_{cmt}$ is the mass of cement, 1.2 is a factor to approximate the mass of cement plus chemically combined water, and V is the volume of concrete produced by the batch. In Equation 5, $E_c$ is the calculated equilibrium density.

$$O_c = (M_{df} + M_{dc} + 1.2 M_{cmt})/V \quad \text{Equation 4}$$

$$E_c = O_c + 50 \text{ kg/m}^3 \quad \text{Equation 5}$$

The flow table test was performed to determine the workability of fresh concrete based on ASTM C230. The flow table consisted of a grip and hinge and a truncated cone that had a height of 50 mm, a base diameter of 100 mm, and a top diameter of 70 mm. The truncated cone was placed in the center of the flow table and filled with the concrete sample in two layers, where 25 strokes were applied using a spatula in each layer. After smoothing and leveling the concrete surface, the cone was removed. Next, the tests were performed by applying 25 drops from a height of 13 mm in 15 s. The diameter of the spread concrete was measured in six directions. The workability was calculated based on Equation 6.

$$\text{Flow (\%)} = (d_{average} - 100 \text{ mm})/(100 \text{ mm}) * 100 \quad \text{Equation 6}$$

where $d_{average}$ is the average value of the measured diameters in six directions (mm), and 100 mm is the base diameter of the cone.

Concrete Compressive Strength

For each concrete sample, three cylindrical samples of 50.8 mm (2 in)*101.6 mm (4 in) were tested according to ASTM C 109 to obtain their compressive strength. The average of three values was reported as the compressive strength of each concrete mixture. The compression test was performed at the curing ages of 7 d, 14 d, and 28 d.

Thermogravimetric Analysis Test

Thermogravimetric analysis (TGA) was performed in order to identify the possible reactions and subsequent chemical products that occurred in the LWA concrete. For this purpose, the TA Instrument Q500 IR was used to carry out TGA tests. Nitrogen gas was used as an inert purge gas to detect the sample decomposition only due to the temperature changes. The TGA samples were obtained after the compressive strength test from the inner core of the failed samples. It was visually checked to ensure that the broken sample contained all concrete constituent. Broken samples of approximately 200 g were crushed using a mortar and pestle and then sieved through ASTM sieve #200 to achieve powder particles of less than about 75 µm in size. A 30 mg concrete powder sample was collected and placed in an alumina crucible pan. The TGA tests were performed by increasing the temperature from the ambient temperature of 23° C. to 900° C. with a 10° C./sec heating rate. The TGA test was performed for the 7 d, 14 d, and 28 d concrete samples.

Isothermal calorimetry Test

The heat of hydration and degree of hydration in LWC was measured using isothermal calorimetry. Four series of isothermal calorimetry experiments were performed, including three mortar samples containing SPoRA, Norlite, and Stalite, and one cement paste. The isothermal calorimetry concrete samples were prepared based on the same mixture proportion values as presented in Table 5, with the exception that coarse LWA was replaced with fine LWA to make mortar samples. The mixture weight prepared for isothermal calorimetry samples was about 10.5 g. It should be noted that fine LWA was used in an SSD condition. The cement and LWA were first placed in a 20 ml ampoule and were gently mixed before introducing water. Then, the water was gently injected into the ampoule using a syringe and then mixed with the solid part for one minute. After the external mixing process, the samples were placed into the isothermal calorimeter cell. The isothermal calorimetry was then carried out at 23° C.±0.1. The heat flow was measured for the samples for 12 days. The degree of hydration for the samples was measured according to Equation 7, $$\alpha_t = Q_t/\Delta_{Hydration} \quad \text{Equation 7}$$

where $\alpha_t$ is the degree of hydration at time t, $Q_t$ is the enthalpy of reactions at time t measured using isothermal calorimetry, and $\Delta_{Hydration}$ is the calculated enthalpy of full hydration. $\Delta_{Hydration}$ was calculated based on the Bogue composition of the cement and the enthalpy of full hydration for C2S, C3S, C3A, and C4AF, according to Taylor's values.

Results and Discussion

The Microstructural Appearance of LWA

Figure 2C:
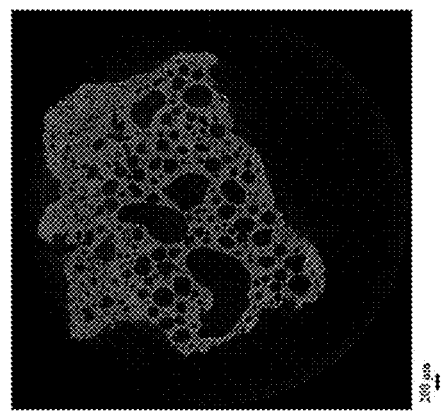
FIG. 2C is a 2D slice from XCT of Stalite LWA.
Figure 2B:
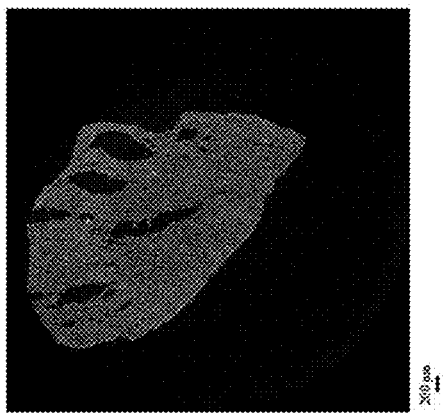
FIG. 2B is a 2D slice from XCT of Norlite, LWA.
Figure 2A:
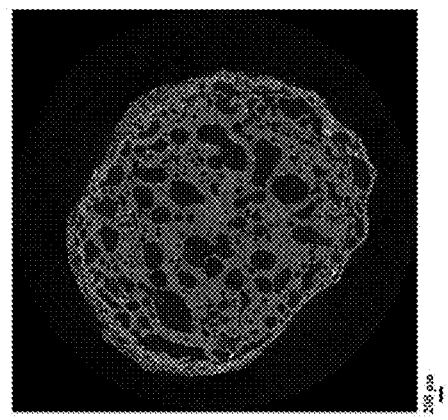
FIG. 2A is a 2D slice from XCT of SPoRA LWA.

The 2D slices in FIGS. 2A-2C show the microstructure of SPoRA, Norlite, and Stalite LWA obtained through XCT. Some similarities could be observed for the pore structure of SPoRA and Stalite LWA. The pore structure of these LWA was formed by spherical type pores and some large pores were formed by coalescence of smaller pores. On the other hand, the pore structure of Norlite was notably different than that of SPoRA and Stalite. Norlite's pore structure was mainly formed of finer macropores. The pore structure of LWA is highly dependent on the formation of the liquid phase and its viscosity during sintering. The formation of larger pores in SPoRA and Stalite could be related to the fact that both LWA had a liquid phase with low viscosity that allowed easier pore expansion and coalescence compared to Norlite LWA. In contrast, Norlite LWA probably had a high viscosity liquid phase that limited the pore expansion in the LWA and resulted in a finer pore structure.

Figure 3A:
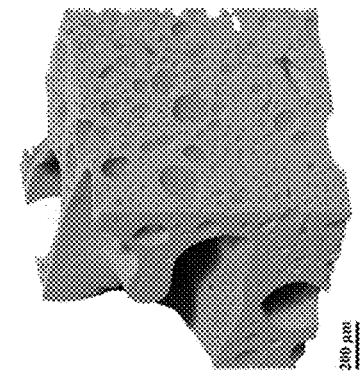
FIG. 3A is a 3D solid phase, total porosity (P) and closed porosity obtained by XCT for SPoRA LWA.
Figure 3B:
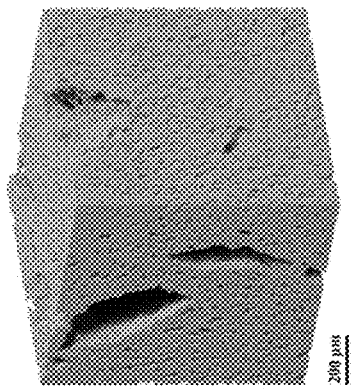
FIG. 3B is a 3D solid phase, total porosity (P) and closed porosity obtained by XCT for Norlite LWA.
Figure 3C:
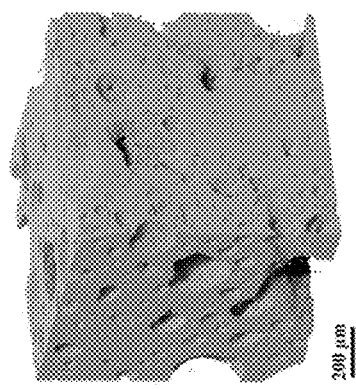
FIG. 3C is a 3D solid phase, total porosity (P) and closed porosity obtained by XCT for Stalite LWA.

FIGS. 3A-3C show the solid phase for SPoRA, Norlite, and Stalite LWA in 3D obtained through XCT, where the calculated total porosity for them was 36.5%, 38.7%, and 56.8%, respectively. The calculated porosity for SPoRA, Stalite, and Norlite LWA obtained by XCT is smaller than the actual porosity of the LWA due to limitations of XCT scanning resolution. Pores smaller than 2.73 μm, which can contribute to the total porosity, are not captured through XCT (see FIG. 5). The closed porosity for the SPoRA, Norlite, and Stalite LWA were 3.2%, 0.17%, and 3.8%, respectively, indicating that the pore structure type (large spherical pores) of SPoRA and Stalite can lead to higher closed porosity.

LWA Water Desorption Behavior

Figure 4:
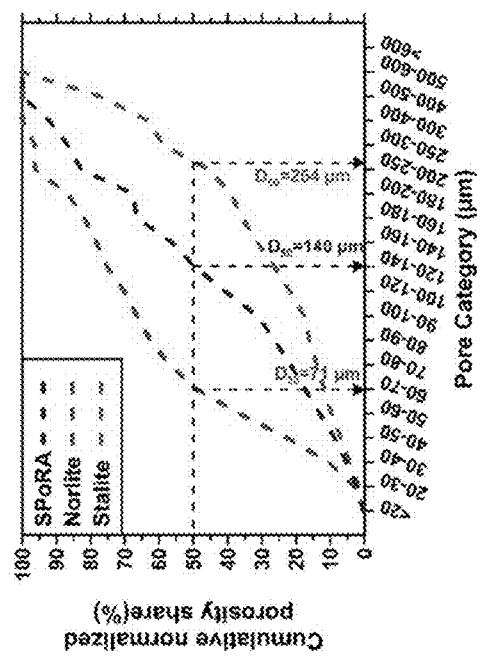
FIG. 4 is a graph of desorption isotherms for SPoRA, Norlite, and Stalite LWA; Note that y axis is broken at 2 for a better representation of the complete range of moisture content data.

FIG. 4 shows the water desorption isotherms for SPoRA, Norlite, and Stalite LWA obtained through DVSA. The desorption behavior of LWA is crucial for the LWA to be used for concrete internal curing applications. The desorption isotherms demonstrate how the LWA will release water to the cement matrix during the self-desiccation period. As can be seen, SPoRA and Stalite had a sudden release of water as RH dropped to 97.5%. Norlite also released a considerable portion of its absorbed water as RH dropped to 97.5%; however, it can be seen there was a gradual water release as the RH further decreased. This behavior indicates that SPoRA and Stalite had coarser pore structures than Norlite LWA, and due to lower capillary suction force, they were able to release the absorbed water at a higher RH. According to ASTM C1761, the LWA has to release more than 85% of its absorbed water as RH drops to 94% RH. SPoRA, Norlite, and Stalite released 98.6%, 93.4%, and 98.4% of their absorbed water at 94% RH, respectively, showing that all comply with the ASTM C1761 requirement. Accordingly, they all have a potential for use in concrete internal curing. As can be seen, SPoRA and Norlite LWA had a water absorption value of 12% at 100% RH (i.e., SSD). In contrast, the water absorption for Stalite LWA was about 6% at 100% RH. Although Stalite showed a promising desorption behavior, its low absorption capacity can make it less desirable candidate than SPoRA and Norlite for concrete internal curing.

LWA Pore Size Distribution

Figure 5:
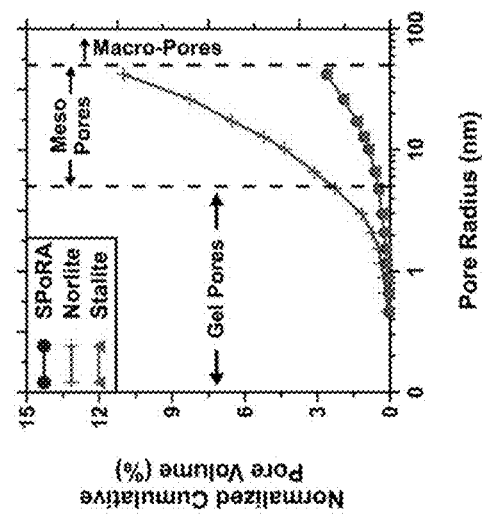
FIG. 5 is a graph of the pore size distribution for SPoRA, Norlite, and Stalite LWA at pore size smaller than 50 nm obtained through DVSA.

FIG. 5 shows the pore size distribution of SPoRA, Norlite, and Stalite LWA for the pores smaller than 50 nm obtained through DVSA. Pores were categorized as gelpores (smaller than 5 nm), mesopores (between 5 nm and 50 nm), and macropores (greater than 50 nm). As can be seen, SPoRA and Stalite had a similar pore structure, and only about 3% of the pores were classified as gel and mesopores, while more than 97% of the pores were classified as macropores. On the other hand, Norlite had a finer pore structure, with about 11% of pores were classified as gel and mesopores, and about 89% of the pores were classified as macropores. As was previously mentioned, one of the most important parameters that can control LWA pore formation is the viscosity of the liquid phase formed during sintering. As was observed from the XCT 2D slices, it can be inferred that SPoRA and Stalite had a low viscosity liquid phase that facilitated the expansion of gas-filled pores in the liquid phase during sintering and consequently a minimal amount (less than 3%) of pores smaller than 50 nm were formed. In contrast, the apparent high viscosity of the liquid phase in the Norlite LWA limited the expansion of gas-filled pores and led to the formation of a higher amount of pores in the gel and mesopore categories.

Figure 6:
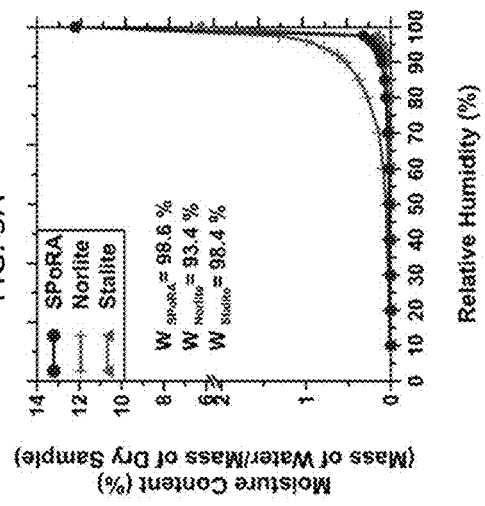
FIG. 6 is a graph of normalized porosity share of pores greater than 2.73 μm for SPoRA, Norlite, and Stalite LWA obtained through XCT.

FIG. 6 shows the cumulative normalized porosity share of different pore categories in LWA obtained using XCT. D50 shown on the figure is defined as the pore size at which the cumulative normalized porosity reaches 50%. The value of D50 for SPoRA, Norlite, and Stalite LWA was 140 μm, 71 μm, and 264 μm, respectively. This observation indicates that for Norlite LWA, 50% of the porosity was comprised of pores smaller than 71 μm, which clearly demonstrated that Norlite had a finer pore structure compared to SPoRA and Stalite LWA. SPoRA LWA had an intermediate pore structure compared to other LWA, where 50% of the porosity was contributed by constituted of pores smaller than 140 μm. Finally, Stalite LWA had the coarsest pore structure among the LWA.

LWA Crushing Resistance

Figure 7:
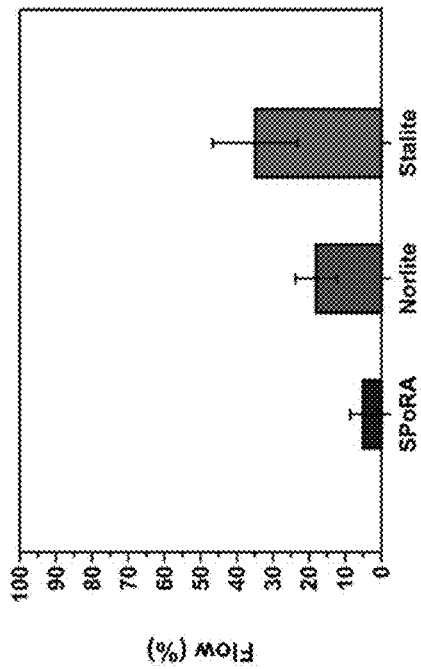
FIG. 7 is a graph of bulk crushing strength of SPoRA, Norlite, and Stalite LWA in different sizes; the hollow circle symbols show the crushing strength of SPoRA single-particle LWA (the bars for bulk LWA and single LWA show ±one standard deviation for three and twenty replicates, respectively)

FIG. 7 shows the crushing resistance of bulk LWA in different size categories. The SPoRA LWA had the lowest crushing resistance in comparison to Norlite and Stalite LWA in all size categories. Moreover, as the SPoRA LWA size increased, the crushing resistance decreased. For Norlite, as the LWA size range increased from [4.75 mm to 5.6 mm] to [6.35 mm to 9.5 mm], the crushing resistance decreased similar to that of SPoRA LWA. However, the crushing resistance stayed constant as the LWA size further increased. In contrast to SPoRA and Norlite LWA, the crushing resistance of Stalite increased as the LWA size range increased from [4.75 mm to 5.60 mm] to [6.35 mm to 9.50 mm]. The average crushing resistance of the Stalite LWA was constant as its size range further increased.

A possible reason for the lower crushing resistance of SPoRA compared to Norlite and Stalite could be related to manufacturing process. For the commercial LWA, big lumps of shale or slate are sintered in a rotary furnace for a prolonged time and then are crushed to the appropriate size. This type of sintering might help with the increase in the strength of the LWA. On the other hand, for SPoRA, firstly, fresh aggregate is made using a pelletizer to form the appropriate particle size, and then are sintered only for a few minutes in a rotary furnace.

Based on the pore size distribution of LWA, one might expect a lower crushing resistance for Stalite due to its coarser pore structure (see FIGS. 3A-3C and FIG. 6) and macropores that were larger compared to the other LWA. However, it should be noted that crushing resistance of a porous material depends not only on the porosity and pore structure of the LWA, but also on the solid phase. The solid phase can play an important role in increasing the strength. The strength of the solid phase can be influenced by mineralogical composition, the amount of liquid phase, and the density of microcracks due to thermal shock during sintering.

The hollow circles in FIG. 7 show the crushing strength of single SPoRA LWA particles. The SPoRA single-particle LWA crushing strength followed the same trend as the bulk LWA crushing strength. This observation further confirmed that for SPoRA LWA the strength decreased as the particle diameter increased. This could be related to the inherent properties of brittle materials; with increasing sample volume the probability of a critical flaw that leads to failure for a given stress increases.

Lightweight Concrete Workability and Fresh Density

LWC pumpability, which is particularly important for ready-mix concrete producers, is directly related to workability (rheology). LWA used in the production of LWC usually has high water absorption, and if this absorption capacity is not accounted for, the workability can be altered. For instance, the use of unsaturated LWA can decrease the workability of concrete significantly due to absorption of available mixture water by LWA and consequently reducing the water to cement mass ratio (w/c). Therefore, to control LWC workability, the LWA is usually presoaked in water for 24 h to 72 h and only then is used for LWC production. To further increase the workability of fresh LWC (and therefore increase pumpability), the use of spherical LWA can be considered. SPoRA LWA was spherical, while Norlite and Stalite were angular.

Figure 8:
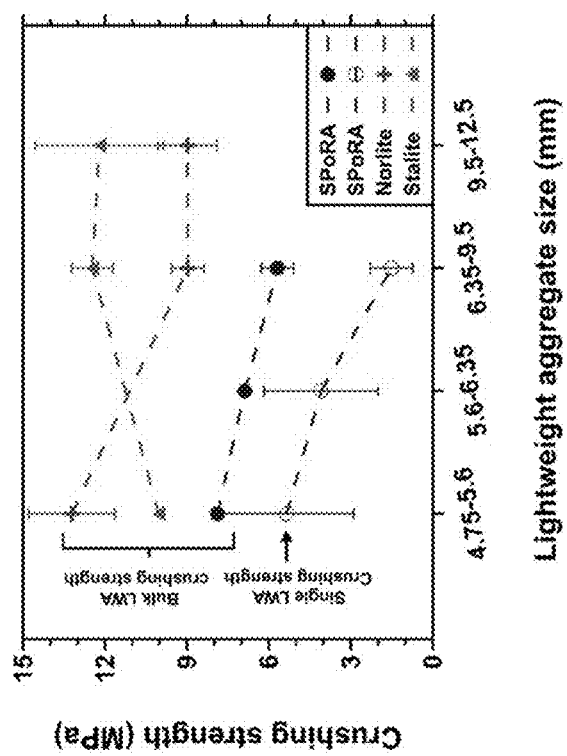
FIG. 8 is a graph of the flow percentage for lightweight concrete prepared with SPoRA, Norlite, and Stalite LWA.

FIG. 8 shows the results of the flow table test for measuring the workability of the fresh LWC. It was expected that the use of SPoRA LWA due to its spherical shape could increase LWC workability compared to LWC prepared with angular LWA. However, interestingly the flow percentage for SPoRA LWC was 5% and that of Norlite and Stalite LWC were 18% and 34.9%, respectively. A possible reason for the reduction of flow percentage for SPoRA LWC could be related to the use of NaOH as the fluxing agent for the production of the SPoRA LWA, where a reaction between SPoRA and cement resulted in the observed reduction. As such, the pH of a mixture of water and LWA was measured over time.

Figure 9:
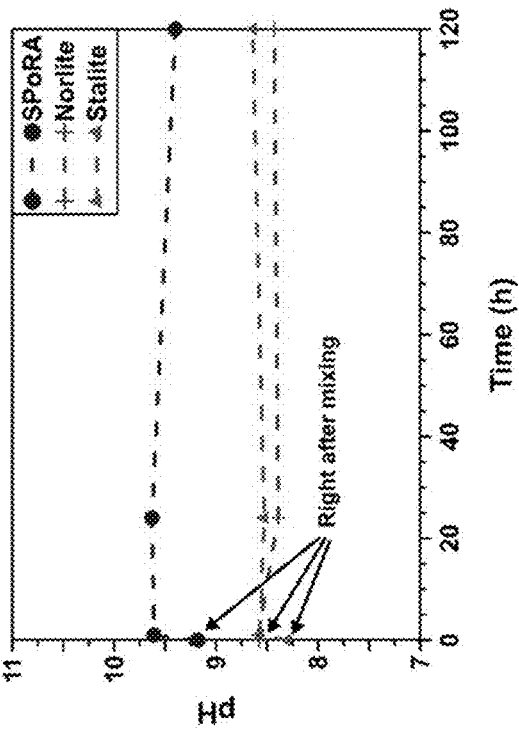
FIG. 9 is a graph of the pH of the SPoRA and water mixture over time.

FIG. 9 shows the pH of a mixture of water and LWA with a 1:1 mass ratio over time. As can be seen, all the LWA had a pH of greater than 7, indicating their slight alkaline nature. Approximately an hour after mixing the LWA with water, the PH level slightly increased for all the LWA and stayed constant after that. SPoRA LWA had higher alkalinity compared to Norlite and Stalite LWA, due to the use of NaOH as the fluxing agent for sintering. It is postulated that some of the added NaOH is capsulated in the liquid phase during sintering. However, the portion that was not capsulated was probably washed into the water and increased the pH value.

Figure 10:
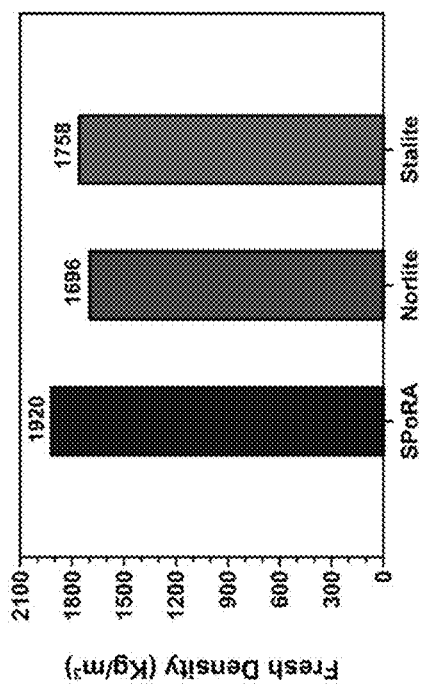
FIG. 10 is a graph of fresh density of lightweight concrete prepared with SPoRA, Norlite, and Stalite LWA.

Since the LWA is added to the concrete mixture in the SSD condition, the fresh density of LWC is directly affected by the LWA specific gravity. From Table 3, SPoRA had the highest SSD specific gravity, followed by Stalite; Norlite had the lowest value. FIG. 10 shows the measured fresh density of SPoRA, Norlite, and Stalite LWC, which follows the same trend.

Lightweight Concrete Density and Compressive Strength

Figure 11:
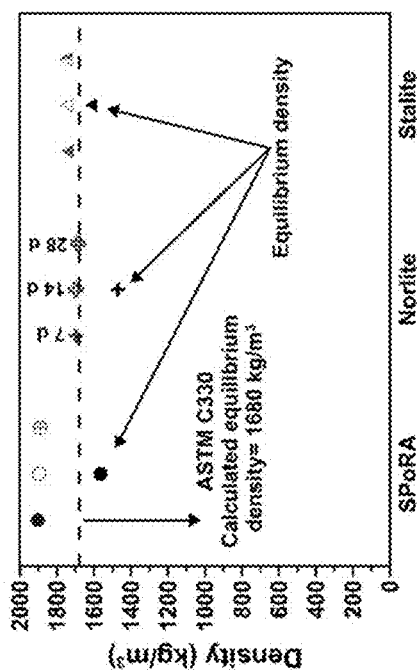
FIG. 11 is a graph of lightweight concrete density at 7 d, 14 d, and 28 d; the lower symbols show the calculated equilibrium density.

FIG. 11 shows the calculated equilibrium density (ASTM C330) and the measured density of LWC samples at 7 d, 14 d, and 28 d. As can be seen, SPoRA LWC had the highest density compared to Norlite and Stalite LWC at all three ages. All the LWC had a calculated equilibrium density of less than 1680 kg/m$^3$, which was the target value based on the ASTM C330 specification. The difference between measured densities and equilibrium density is related to the moisture that is retained in the LWC samples, which was not given a chance to be released as the samples were cured in a sealed condition (moisture transfer between sample and environment prevented).

Figure 12:
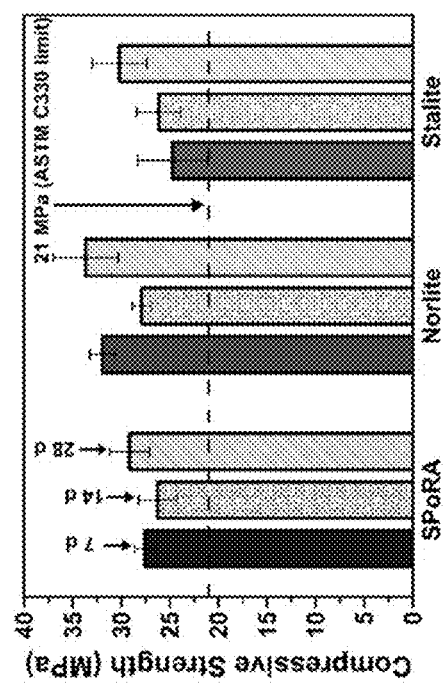
FIG. 12 is a graph of compressive strength of lightweight concrete prepared with SPoRA, Norlite, and Stalite LWA at 7 d, 14 d, and 28 d.

FIG. 12 shows the compressive strength of various LWC samples at 7 d, 14 d, and 28 d. For SPoRA LWC and Norlite LWC, the average compressive strengths at 14 d were slightly less than the 7 d values. The 7 d and 14 d values for SPoRA LWC were within the range of standard deviation. However, for Norlite LWA, this decrease was more than the standard deviations so that the reason behind this reduction is not clear and needs further investigation. In contrast, for Stalite LWC the compressive strength increased at 14 d compared to 7 d. The 28 d compressive strength for all the LWC samples was higher than that of their 7 d and 14 d values. This observation indicated that continuous cement hydration through the provided internal curing water resulted in higher compressive strength.

According to ASTM C330, structural LWC with a maximum calculated equilibrium density of 1680 kg/m3 shall have a minimum compressive strength of 21 MPa at an age of 28 d. As can be seen, all the LWC mixtures passed this requirement. An important observation regarding the compressive strength of the LWC samples was that their compressive strength did not follow the same trend as the LWA crushing resistance (see FIG. 7). Although SPoRA LWA had the lowest crushing resistance among the LWA, it had a 28 d compressive strength of about 30 MPa, almost equal to that of Stalite LWC. This observation indicates that LWA strength does not have a considerable impact on the final compressive strength of the concrete composite.

Thermogravimetric Analysis

FIGS. 13A-13C show the differential TGA curves for LWC powder samples at 7 d, 14 d and 28 d. Each peak in the differential TGA curve is related to the decomposition of a phase over a specific temperature change, which is identified on the figure. Norlite and Stalite LWC had similar thermal behavior at different ages.

The differential TGA curves for SPoRA LWC showed the formation of a smaller amount of $Ca(OH)_2$, which is the byproduct of cement hydration. Two potential reasons could be considered for this observation: (i) pozzolanic reaction between the SPoRA and cement paste resulted in $Ca(OH)_2$ reduction or (ii) the interference of NaOH as the fluxing agent with cement reactions suppressed the hydration of cement and reduced the $Ca(OH)_2$ for SPoRA LWC. Future investigation is required to more fully understand the possible interactions of SPoRA LWA and cement during hydration.

The peaks in the range of 600° C. to 700° C. could be related to carbonate phases formed in the concrete, where the peaks were larger for 7 d SPoRA LWC. This could be related to the fact that the fly ash used for the production of SPoRA had a high free carbon content, which potentially led to the formation of higher content of carbonate phases through the reaction of fine SPoRA LWA. However, as the samples aged, the carbonate-type phases had a similar decomposition intensity in the LWC. A strong phase decomposition was observed for SPoRA LWC starting at 750° C., which could be related to the decomposition of phases available in the SPoRA LWA. The peak intensity did not change notably over time. As such, it might be inferred that the SPoRA LWA possessed an inert phase that potentially did not interfere with the cement hydration. However, further investigation is required to determine the exact nature of this phase and its reactivity with cementitious phases.

Isothermal Calorimetry

FIG. 14A shows the normalized heat of hydration for cement paste, and SPoRA, Norlite, and Stalite mortars over a 12 d period. As can be seen, the control cement paste (no LWA) had the lowest heat release during the hydration compared to the mortar samples. The higher heat of hydration for the mortar samples was related to the extra water that the LWA provided through the internal curing mechanism, leading to a higher amount of cement hydration. This observation indicated that all the LWAs were successful in releasing water to the cement to promote hydration. Among the mortar samples, Norlite and Stalite mortars had the highest heat of hydration and demonstrated a very similar behavior for the heat of hydration. On the other hand, the SPoRA mortar sample had a lower hydration heat than Norlite and Stalite mortars. This observation contrasted with what was expected for SPoRA LWA. As it was indicated in Table 3, SPoRA LWA had the highest water absorption capacity among the LWA. As such, it was expected that SPoRA LWA could release more water to cement paste and result in a higher heat of hydration. A possible reduction for the heat of hydration in the SPoRA mortar sample could be related to the chemical composition of SPoRA LWA. As it was observed in FIG. 9, SPoRA LWA had higher alkalinity compared to other LWA. It is expected that the excess NaOH used as the fluxing agent could influence the hydration of cement in the matrix. The addition of NaOH to cement could decrease the cement degree of hydration at later ages; however, they stated that the reason for this reduction was unclear. FIG. 14B shows the measured degree of hydration for cement paste and for the SPoRA, Norlite, and Stalite mortar samples, which follows the same trend as that of the heat of hydration. The 12 d degree of hydration for cement paste, and the SPoRA, Norlite, and Stalite mortar samples, was 65.6%, 70%, 72.6%, and 73.4%, respectively. It should be noted that as the heat of hydration during the first 45 min was not measured, the actual degree of hydration for the samples could be slightly higher. Future research is required to fully understand the hydration properties of SPoRA mortar samples at early age (first 45 minutes) and at greater ages.

The engineering properties of fly ash-based LWA (i.e., SPoRA) and its associated LWC with two commercial LWAs were studied and compared. The SPoRA was designed based on a thermodynamics-based framework through a scale-up manufacturing process. Engineering properties (i.e., specific gravity, water absorption, and dry rodded unit weight, and crushing resistance) and pore structure of the fly ash-based LWA were characterized and compared with shale and slate-based commercial LWA available in the US market. Fresh, mechanical, and hydration properties of LWC were characterized. The following conclusions can be drawn based on this work:

LWA Engineering Properties:

Fine and coarse SPoRA LWA had the highest 72 h water absorption compared to Norlite and Stalite LWA, which suggested a highly porous microstructure for SPoRA LWA with superior absorption capacity. The higher absorption capacity of SPoRA LWA led to a higher SSD specific gravity compared to Norlite and Stalite LWA. The dry rodded unit weight for fine and coarse SPoRA LWA passed the ASTM C330 requirement.

The desorption isotherms indicated that SPoRA along with the other LWAs complied with the ASTM C1761 requirement for concrete internal curing applications, i.e., releasing more than 85% of absorbed water as the RH falls below 94%. The pore size distribution of the LWA obtained through DVSA and the Kelvin-Young-Laplace equation indicated that for SPoRA and Stalite LWA less than 3% of the pores were classified as gel and mesopores (i.e., pores smaller than 50 nm), while more than 97% of the pores were classified as macropores. In contrast, for Norlite LWA about 11% of the pores were classified as gel and mesopores and 89% of the pores were classified as macropores. This observation further confirmed the coarser pore structure of SPoRA LWA.

The XCT observations showed that SPoRA LWA's pore structure consisted mainly of large spherical macropores, which was similar to the pores of the Stalite LWA. This behavior was related to the low viscosity of the liquid phase formed in the LWA during sintering, which facilitated gas-filled pore expansion in the LWA. The LWA pore size distribution for the pores greater than 2.73 μm was characterized using XCT. It was determined that SPoRA had an intermediate macropore structure, where it had a D50 larger than Norlite and smaller than Stalite. This intermediate pore structure provided superiority in water absorption capacity and water desorption performance compared to Stalite and Norlite.

The LWA crushing strength indicated that this value is particle-size dependent. The SPoRA LWA crushing strength decreased linearly as the particle size increased and in all size ranges, the SPoRA LWA had a lower crushing strength than Norlite and Stalite LWA. Two reasons could be considered for this observation (i) related to production parameters and (ii) related to pore-solid properties of the LWA. SPoRA production process entailed only a few minutes of sintering while that of Norlite and Stalite LWA included sintering for a prolonged time (close to one hour). Further investigation is required to understand the LWA's solid phase strength.

Structural LWC Properties:

It was expected that using SPoRA for LWC preparation would increase the workability of fresh LWC due to its spherical shape. However, it was observed that SPoRA LWA reduced the workability of LWC compared to LWC prepared with Norlite and Stalite LWA. A reason behind this observation could be related to the use of NaOH as the fluxing agent for SPoRA LWA. The pH measurement for the LWA over time indicated that SPoRA had higher alkalinity compared to other LWA, which was directly related to the use of NaOH.

Fresh density measurements showed that SPoRA LWC had the highest fresh density. This observation was due to the high SSD specific gravity of SPoRA LWA in comparison to other LWA. The calculated equilibrium density for all the LWC was slightly below the ASTM C330 requirement of 1680 kg/m3. The difference between the calculated equilibrium density and the measured density at 7 d, 14 d, and 28 d was related to the moisture content available in the microstructure of the LWA.

The SPoRA and Stalite LWC mixtures had almost the same 28 d compressive strength (about 30 MPa), even though the crushing resistance of the SPoRA LWA was notably smaller than that of Stalite LWA. This observation suggested that the LWA crushing strength is probably not the most crucial factor that controls the strength of the LWC composite.

DTGA curves indicated decomposition of similar phases in LWC samples prepared with the various LWA. The Ca(OH)2 decomposition intensity for SPoRA LWC was lower than that of Norlite and Stalite LWC, which could be related to (i) a lower degree of hydration for SPoRA LWC or (ii) pozzolanic reactivity of SPoRA LWA. Decomposition of an unknown phase starting at 750° C. was observed for SPoRA LWC, which requires further investigation to determine its nature and potential reaction with cement.

Isothermal calorimetry was used to monitor the heat of hydration in mortar samples and measure the degree of hydration over time. The results indicated that all the mortar samples were successful in increasing the heat of hydration compared to that of cement paste by providing internal curing water. However, the SPoRA mortar samples demonstrated lower heat of hydration compared to Norlite and Stalite mortar samples, even though the SPoRA LWA, due to its higher water absorption capacity, could provide more internal curing water and further increase the heat of hydration. The reason behind this reduction in the heat of hydration may be the use of NaOH as the fluxing agent in SPoRA production that might interfere with cement hydration.

Manufacturing of waste fly ash-based LWA (SPoRA) can be successfully scaled-up using a pelletizer and rotary furnace at the lab-scale. This manufacturing can be further scaled-up for production of SPoRA at the industrial scale. It was shown that through the scale-up manufacturing a promising construction LWA that meets the ASTM C330 standards requirement for structural LWA can be produced. In addition, it was shown that the developed LWC using SPoRA will meet the ASTM C330 requirements for structural LWC. The LWC made using SPoRA, although had a lower workability compared to LWC made with traditional LWA, demonstrated similar mechanical performance.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An aggregate comprising fly ash having a loss on ignition greater than 6%, wherein the aggregate comprises sodium hydroxide wherein the aggregate comprises a concentration of mass of the NaOH per mass of the fly ash of 2%.

2. The aggregate according to claim 1, wherein the aggregate has a generally spherical shape.

3. The aggregate according to claim 1, having a loss on ignition of greater than 5% by mass.

4. The aggregate according to claim 1, wherein equilibrium density is less than 1680 kg/m3.

5. The aggregate according to claim 1, wherein the compressive strength is more than 21 MPa.

6. The aggregate according to claim 1, wherein a 72 hour absorption percentage with particles smaller than 4.75 mm is greater than 10%.

7. The aggregate according to claim 1, wherein a 72 hour absorption percentage with particles equal to and greater than 4.75 mm is greater than 10%.

8. The aggregate according to claim 1, wherein a dry rodded weight of the aggregate in kg/m3 with particles smaller than 4.75 mm is less than 1120.

9. The aggregate according to claim 1, wherein a dry rodded weight of the aggregate in kg/m3 with particles greater than 4.75 mm is less than 880.

10. The t aggregate according to claim 1, wherein a dry rodded weight of the aggregate in kg/m3 is less than 1040.

11. The aggregate according to claim 1, wherein the fly ash has a calcium oxide content greater than 18% by mass.

12. The aggregate according to claim 1, wherein the NaOH initiates geopolymerization to chemically bind the fly ash together to form a spherical shape.

13. The aggregate according to claim 1, wherein the aggregate has a pH greater than 7.

14. An aggregate consisting of:

fly ash; and sodium hydroxide (NaOH) wherein the aggregate comprises a concentration of mass of the NaOH per mass of the fly ash of 2%.

* * * * *